W. ELLIOTT & R. H. SCHLACHTER.
DRAFT EQUALIZER.
APPLICATION FILED SEPT. 30, 1909.
947,894.
Patented Feb. 1, 1910.
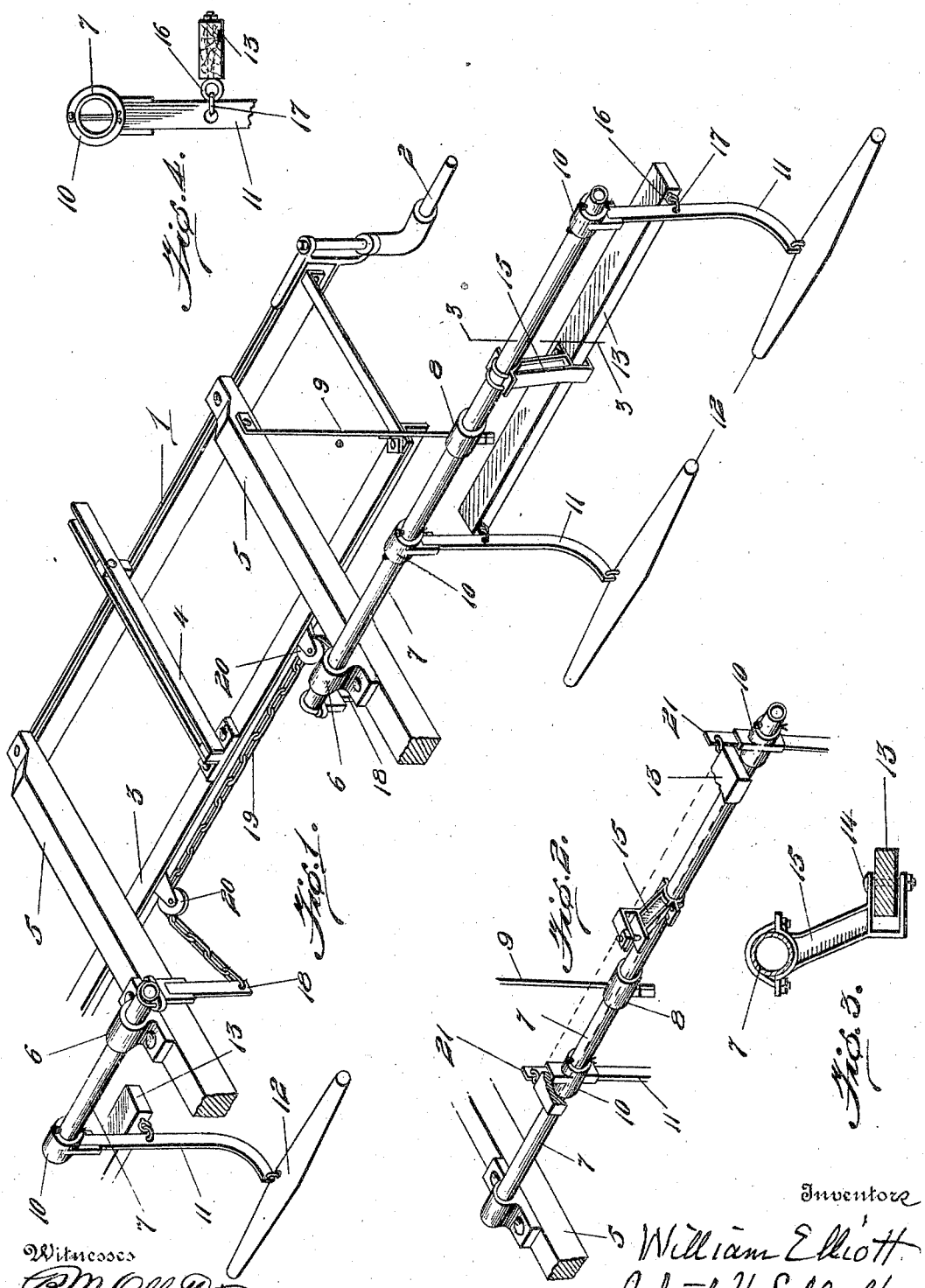
Inventors
William Elliott
Robert H. Schlachter
By Frank A. Spencer Attorney
Witnesses
B. M. Offutt
D. H. Moran

UNITED STATES PATENT OFFICE.

WILLIAM ELLIOTT AND ROBERT H. SCHLACHTER, OF BEATRICE, NEBRASKA, ASSIGNORS TO DEMPSTER MILL MANUFACTURING COMPANY, OF BEATRICE, NEBRASKA.

DRAFT-EQUALIZER.

947,894.

Specification of Letters Patent.   Patented Feb. 1, 1910.

Application filed September 30, 1909. Serial No. 520,287.

*To all whom it may concern:*

Be it known that we, WILLIAM ELLIOTT and ROBERT H. SCHLACHTER, citizens of the United States, residing at Beatrice, in the county of Gage and State of Nebraska, have invented certain new and useful Improvements in Draft-Equalizers, of which the following is a specification.

Our invention relates to draft-equalizers for wheel cultivators or other wheeled agricultural implements, or vehicles, and especially to devices for equalizing the draft of four horses, two on each side of the implement.

Another object of our construction is to overcome the downward strain, or "neck-weight," usually produced on the necks of the horses by the pressure of the tongue, due to the fact that the forward ends of the plow-beams are usually attached, in implements of this class, either directly or indirectly, to the tongues in front of the axle of the machine. We counteract this neck-weight by providing for the application of the traction power at points in the machine as low down as is compatible with its proper operation.

We also employ in this implement rotatable draw-bars mounted to rotate in bearings attached to the frame, to which bars the traction is applied in such a manner that the equalization is effected by the rotation of said draw-bars.

In the foregoing particulars our present invention is practically identical with the construction shown in an application filed by us June 21, 1909, and bearing Serial Number 503,506. The special peculiarity of our present invention is the employment, in connection with the rotatable draw-bars, of flexibly mounted equalizing-bars, located either below or above said rotating bars, the traction power being applied first to said equalizing-bars, and being thence transmitted, by suitable connections to the rotating draw-bars, as hereinafter described.

In the accompanying drawings Figure 1 is a perspective view of a portion of a cultivator provided with our improvements, parts not immediately involved being omitted. Fig. 2 shows a modification of the construction shown in Fig. 1, the equalizing-bar being located above the rotating bar, instead of below it. Fig. 3 is a vertical section through the rotating draw-bar and the equalizing-bar, on the line 3—3 of Fig. 1. Fig. 4 is an end elevation of said draw-bar, equalizing-bar, and a draft-bar.

1 indicates the main sill or axle of the implement, to the ends of which are pivoted the crank axles 2.

3 and 4 are members of the main frame.

5 indicates the poles or tongues projecting forward from the frame, rigidly secured thereto, and practically forming a part thereof. On the tongues are secured sleeves 6, which form bearings for one end of the rotatable draw-bars 7. The other bearings for said draw-bars are the loose sleeves 8, rigidly secured to the diagonal bars 9, extending from the tongue 5, and supported by the frame. The draw-bars 7 carry, on each side of the bearings 8, loose sleeves 10, to which are rigidly attached depending draft-bars 11, connected at their lower ends to swingletrees 12. Extending between said draft-bars 11, and flexibly connected thereto, are horizontal equalizing-bars 13. Said bars are pivoted centrally to bolts 14, set in brackets 15, which brackets are rigidly secured to draw-bars 7, so that traction applied to said equalizing-bars 13 will rotate draw-bars 7. The equalizing-bars 13 are flexibly connected to the draft-bars 11 in any preferred manner. We have shown a suitable connection in Fig. 4, in which eyebolts 16 pass through the equalizer-bars and engage links 17 carried by the draft-bars 11.

The inner ends of the rotating draw-bars 7 carry extending radial arms 18, to the outer ends of which is connected a chain 19, which passes across the machine, guided by the sheaves 20, to the corresponding radial arm on the opposite side. If desired a fifth horse may be employed between the tongues, with any desired or suitable means for connecting him with the chain 19, or other cross-connection, so that his power will be utilized together with that of the outer horses, and equalized therewith. Any preferred devices or form of connection between the opposite sides of the implement may be substituted for the chain 19, it not being the purpose of our present application or claims to cover any special form of cross-connection.

In operation it will be seen that when traction is applied to the draft-bars 11 the power will be communicated, through equalizer-bars 13, to the fixed brackets 15, and that draw-bars 7 will be rotated, together with radial arms 18, thus operating any suitable devices for connection with the opposite side of the implement, as hereinbefore indicated.

In the modification of our device shown in Fig. 2 the equalizer-bars 13 are located above the draw-bars 7, upward extensions 21 of the draft-bars 11 being provided, and the position of the brackets 15 being changed, so as to support the equalizer-bars in elevated position. The operation in this form is practically the same as in that shown in Fig. 1.

Having described our invention, we claim as new and desire to secure by Letters Patent:

1. In an implement of the class described, in combination with a main frame, a rotatable draw-bar mounted in bearings carried by the frame, pendent draft-bars pivoted on said draw-bar, a bracket secured to said draw-bar, an equalizing-bar pivoted centrally to said bracket, substantially parallel with said draw-bar, flexible connections between said equalizing-bar and said draft-bars, a rigid radial arm extending from said draw-bar, and suitable connections between said radial arm and other operative parts of the implement.

2. In an implement of the class described, in combination with the frame, an equalizing device comprising rotatable draw-bars mounted on opposite sides of the implement, suitable bearings for said draw-bars, a pair of pendent draft-bars loosely pivoted on said draw-bars, brackets secured on the draw-bars between the pivotal points of the draft-bars, substantially horizontal equalizing-bars pivoted centrally to said brackets, flexible connections between said equalizing-bars and the draft-bars, radial arms carried by said draw-bars, and means extending across the implement for flexibly connecting the radial arms on the opposite sides thereof.

In testimony whereof we affix our signatures in presence of two witnesses.

WILLIAM ELLIOTT.
ROBERT H. SCHLACHTER.

Witnesses:
D. W. CARRE,
F. S. STONE.